United States Patent [19]

Aguet

[11] 3,832,845
[45] Sept. 3, 1974

[54] COMBINED GAS AND STEAM POWERPLANT WITH SUPPLEMENTARY STEAM MIXING

[75] Inventor: Emile Aguet, Winterthur, Switzerland

[73] Assignee: Sulzer Brothers Ltd., Winterthur, Switzerland

[22] Filed: Aug. 28, 1973

[21] Appl. No.: 392,183

[30] Foreign Application Priority Data
Sept. 7, 1972    Switzerland................ 13133/72

[52] U.S. Cl............ 60/39.18 B, 60/39.05, 60/39.55
[51] Int. Cl. ................... F01k 23/06, F02c 7/02
[58] Field of Search..... 60/39.18 B, 39.18 R, 39.05, 60/39.55, 39.58, 39.59

[56] References Cited
UNITED STATES PATENTS

| 2,357,041 | 8/1944 | Woolley | 60/39.18 B |
| 2,718,755 | 9/1955 | Heller | 60/39.18 R |
| 3,335,565 | 8/1967 | Aguet | 60/39.05 |
| 3,461,667 | 8/1969 | Aguet | 60/39.55 |
| 3,756,029 | 9/1973 | Aguet | 60/39.18 B |

Primary Examiner—William L. Freeh
Assistant Examiner—Warren Olsen
Attorney, Agent, or Firm—Kenyon & Kenyon Reilly Carr & Chapin

[57] ABSTRACT

In addition to tapping off a flow of steam from the steam turbine for mixing into the combustion gas flow to the gas turbine in order to regulate the temperature of the combustion gas flow, the plant can be regulated to insure continued operation of the air compressor and generator at low loads. To this end, a supplementary means is provided to tap off steam for mixing into the gas flow when the load decreases. The decrease in load can be measured off the generator run by the gas turbine or the generator run by the steam turbine.

9 Claims, 3 Drawing Figures

COMBINED GAS AND STEAM POWERPLANT WITH SUPPLEMENTARY STEAM MIXING

This invention relates to a gas and steam turbine plant.

Plants have been known, for example, as described in U.S. Pat. application Ser. No. 168,688, now U.S. Pat. No. 3,756,029, filed Aug. 3, 1971, in which a compressor, a charged steam generator and a steam turbine are connected in series and a gas turbine is connected to the outflow of the steam generator. In such plants, steam has been tapped from the steam generator and delivered into the combination gas flow to the gas turbine in order to regulate the temperature of the combustion gas flow. The amount of added steam has been regulated via a throttling device in dependence on the temperature of the gas/steam mixture delivered to the gas turbine. For a given performance and a relatively good efficiency, such a plant is characterized by a low plant cost. Further, such a plant is particularly suited to the production of peak current.

However, such plants have not been particularly efficient at low loads. Because of this, in some instances, it has been necessary to adjust the energy balance of the plant by driving the generator with expensive electric current.

Accordingly, it is an object of the invention to improve the efficiency of the existing plants as above described.

It is another object of the invention to further simplify the construction and operation of plants as above described.

It is another object of the invention to avoid the need for requiring electric current to drive a charged steam generator of a power plant as above described at low loads.

It is another object of the invention to maintain a minimum plant performance for idling.

Briefly, the invention is directed to a plant having a compressor, a charged steam generator, a gas turbine and a steam turbine as well as a conduit means extending from a tap in the steam turbine for delivering a flow of steam into a mixing point between the generator and gas turbine and a temperature responsive means for regulating the amount of delivered steam in response to the temperature of the gas/steam mixture. The invention provides such a plant with a supplementary means for supplying an increased quantity of steam from the steam turbine to the gas turbine in response to decreasing plant performance in a low load performance region of the plant.

By supplying an increasing quantity of steam with decreasing load, the power converted in the gas turbine is always sufficient to drive the compressor and generator. Thus, it is not necessary to adjust the energy balance by driving the generator with expensive electric current. Moreover, by supplying steam, the pressure in the steam-generator is increased, so that the heat-transfer at the steam-generator's heating surfaces becomes improved. This has the effect that the exhaust-gas losses become less. Because of the better heat-transfer, more steam is produced in the steam-generator, thereby compensating for the removal of a partial quantity of steam from the steam turbine.

Where the plant has a mixing point at which the delivered steam is introduced into the combustion gas flow to the gas turbine, the supplementary means can also be connected to such a point to deliver the increased quantity of steam required for low load operation. This not only eliminates the need for a second mixing point and related devices for mixing steam with the combustion gases, but also allows the existing mixing point to be disposed at the most favorable location for both purposes.

Where the plant has a throttle means in the temperature responsive means for controlling the amount of steam which is tapped from the steam generator, the supplementary means can be connected to this existing throttle means. In this way, the need for an additional throttle means can be avoided. It is also possible to control the supplementary means via the output or the speed of the gas turbine.

In both cases, existing measuring equipment may be used, leading to a lowering of the plant costs.

It is also possible to have the supplementary means influenced by the performance of the gas turbine. In this case, the flow from the generator connected with the gas turbine can directly form a control magnitude for setting the throttling means. It is thus possible to avoid the need for a separate regulator.

In one embodiment the supplementary means comprises a limit-indicator. In this case, the limit-indicator prevents the generator from falling below zero performance in producing current so that a minimum performance of the plant, as needed for idling, is maintained. It is also possible to provide the supplementary means with a function-indicator which, below an existing limit-performance and with decreasing performance, gives an increasing control magnitude for the quantity of supplementary steam. In this way, it is possible to control the quantity of supplementary steam in accordance with an exactly proportionate relation.

Finally, it is also possible to connect the supplementary means to a tap in the steam turbine upstream of the existing tap. In this way, with a decreasing load, the drop of pressure occurring at the first tap can be compensated.

These and other objects and advantages of the invention will become more apparent from the following detailed description and appended claims taken in conjunction with the accompanying drawings in which:

Figure 1:
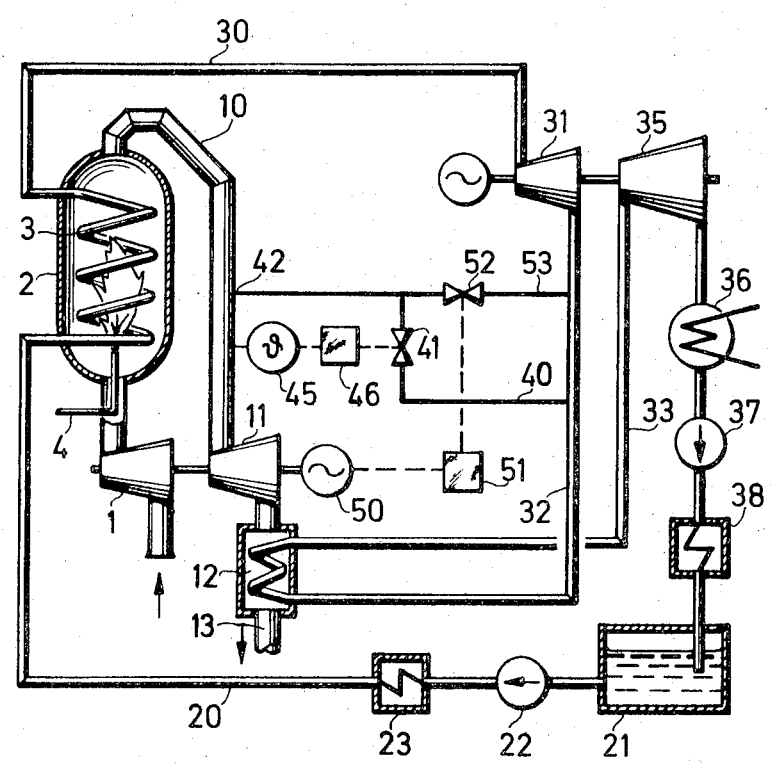
FIG. 1 illustrates a circuit diagram for a gas and steam turbine plant according to the invention in which a supplementary throttling means is provided for steam admixture and is influenced over a regulator by the performance of an electric generator associated with the gas-turbine group.

Referring to FIG. 1, the plant has a compressor 1 for compressing air and for delivering the air to the pressure-vessel 2 in which a steam-generator 3 is disposed. The compressed air is supplied for the combustion of a liquid or gaseous fuel supplied through a conduit 4 to the pressure vessel 3. A conduit 10 connects the pressure vessel 2 with a gas turbine 11 to deliver a flow of combustion gases to the turbine 11 for expansion therein and subsequent escape through a conduit 13 into the atmosphere. The steam generator 3 is supplied with feed water via a pipe 20 from a tank 21, the feed water being pumped by a pump 22 through the pipe 20 and heated in a high pressure preheater 23.

The feed water which is evaporated in the steam generator 3 and superheated in the pressure vessel 2 is conducted as live steam through a pipe 30 which connects the steam generator 3 with a high pressure turbine 31 of a steam turbine group. After partial expansion, the steam passes through a conduit means from a first tap 32' in the turbine 31. This conduit means includes a pipe 32 which connects the turbine 31 with an intermediate superheater 12 in the conduit 13. Thereafter, the steam passes through a pipe 33 to a low-pressure turbine 35 of the steam-turbine group. The steam is then condensed in a condenser 36, and the condensate is, by way of a condensate-pump 37 and a preheater 38, returned to the feed-water tank 21. The conduit means also includes a connection pipe 40 which branches from the pipe 32 and runs to an mixing point 42 in the combustion-gas pipe 10. A temperature responsive means in the form of a throttle means 41, a temperature-measuring instrument 45 and a regulator 46, which may be made as a limiting regulator, is provided to control the amount of steam delivered to the pipe 10 in dependence on the gas/steam mixture fed to the gas turbine 11. In operation, the temperature measuring instrument 45 measures the gas/steam mixture temperature and emits a signal to the regulator 46. The regulator 46, in turn, controls the throttle means 41 to control the flow of steam.

As shown, the compressor 1 and gas turbine 11 are mounted on a common shaft and connected to an electric generator 50. A supplementary means for introducing an increased quantity of steam into the gas turbine 11 is connected between the steam turbine 31 and gas turbine 11 and is controlled by the output or speed of the generator 50. This supplementary means includes a branch pipe 53 connected between the pipe 32 and the connection pipe 40 to bypass the throttle means 41, a throttle means 52 such as a control valve in the branch pipe 53, and a regulator 51 connected to the electric generator 50. The regulator 51 is preferably made as a limiting regulator to open the throttle means 52, for example, when the output or speed of the generator 50 or else the pressure in the pressure vessel 2 falls below a preset limit value.

Alternatively, instead of using the generator 50, it is also possible for an instrument measuring the speed of the gas-turbine group 1, 11, to act on the regulator 51 so that a limit speed set at the regulator 51 is not fallen short of.

Figure 2:
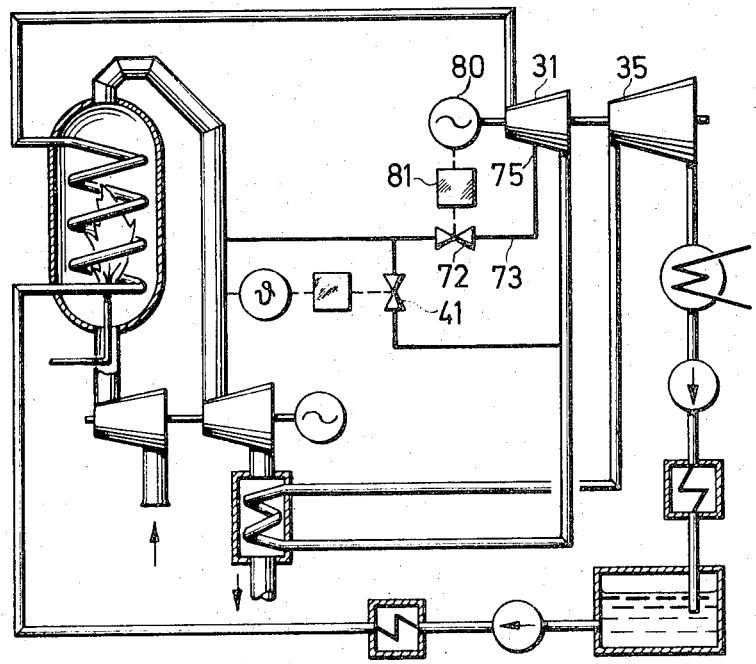
FIG. 2 illustrates a second circuit diagram in which the throttling means is controlled by the performance of a generator associated with the steam turbine in accordance with the invention.

Referring to FIG. 2, wherein like reference characters indicate like parts as above, the second throttling means 72 of the supplementary means is disposed in a pipe 73, which likewise bypasses the throttling means 41, but however branches off from a second tap 75 of the high-pressure turbine 31 of the steam-turbine group and is disposed upstream of the first tap 32'. A further difference in comparison with the construction of FIG. 1 is that the second throttling means 72 is controlled by the output of a generator 80 mounted on the same shaft as the steam-turbine group 31, 35 through the intermediary of a function-transmitter 81. The function-transmitter 81 is made so that, with a decreasing load, the throttling means 72 becomes increasingly opened.

With the forms of construction of FIGS. 1 and 2, a special throttling means 52 and 72, respectively, is provided in each case for the flow of steam influenced by the supplementary means. It is, however, also possible to have the supplementary means act on the first throttling means 41 in the connection pipe 40. Such a construction is shown in FIG. 3, which for the rest corresponds with the construction of FIG. 2, the same parts being provided with the same reference numerals.

Figure 3:
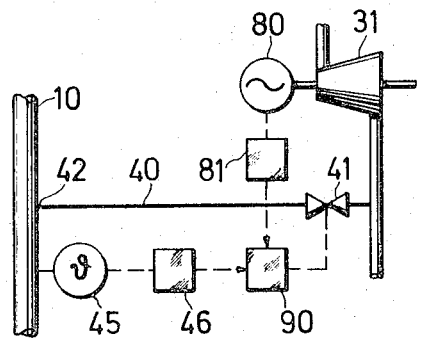
FIG. 3 illustrates a partial diagram of a plant in which the supplementary means of the invention acts on the already existing first throttling means.

As shown in FIG. 3, a selecting organ or device 90 is disposed between the regulator 46 and the throttling means 41 to which is simultaneously supplied the signal from the function-transmitter 81 and the signal from the regulator 41. The function of the selecting device 90 is to select and conduct the larger of the two received signals to the throttling means 41.

What is claimed is:

1. A gas and steam turbine plant comprising
a compressor for compressing air,
a charged steam generator connected to said compressor to receive compressed air therefrom,
a gas turbine connected downstream of said charged steam generator to receive a flow of combustion gas therefrom,
a steam turbine connected downstream of said charged steam generator to receive a flow of steam therefrom,
conduit means extending from a first tap in said steam turbine for delivering a flow of steam into a mixing point between said charged steam generator and said gas turbine for mixing with the flow of combustion gas,
a temperature responsive means for measuring the temperature of the combustion gas/steam flow delivered to said gas turbine and for regulating the amount of steam delivered to said mixing point in response to the measured temperature, and
a supplementary means connected between said steam turbine and said gas turbine for supplying an increased quantity of steam to said gas turbine in response to a decreasing performance of the plant in a low load performance region of said plant.

2. A gas and steam turbine plant as set forth in claim 1 wherein said supplementary means is connected to said mixing point for introducing the increased quantity of steam into the flow of combustion gas thereat.

3. A gas and steam turbine plant as set forth in claim 1 wherein said temperature responsive means includes a throttle means in said conduit means and said supplementary means is connected to said throttle means to open said throttle means in response to decreasing performance of said plant in said low load region.

4. A gas and steam turbine plant as set forth in claim 1 wherein said supplementary means is responsive to the output of said gas turbine whereby at decreasing performance an increased quantity of steam is supplied to said gas turbine.

5. A gas and steam turbine plant as set forth in claim 1 wherein said supplementary means is responsive to the speed of said gas turbine whereby at decreasing performance an increased quantity of steam is supplied to said gas turbine.

6. A gas and steam turbine plant as set forth in claim 4 wherein said supplementary means includes a limiting regulator.

7. A gas and steam turbine plant as set forth in claim 1 wherein said supplementary means is responsive to the output of said steam turbine whereby at decreasing performance an increased quantity of steam is supplied to said gas turbine 8. A gas and steam turbine plant as set forth in claim 7 wherein said supplementary means includes a function-transmitter for increasing the quantity of steam supplied to said gas turbine in proportionate relation with a decreasing performance below a preset limit performance.

9. A gas and steam turbine plant as set forth in claim 1 wherein said supplementary means is connected to a second tap in said steam turbine upstream of said first tap to supply steam at a higher pressure than at said first tap.

* * * * *